(Model.)
H. N. JOHNSTON.
Combined Gleaner and Binder.
No. 237,540. Patented Feb. 8, 1881.
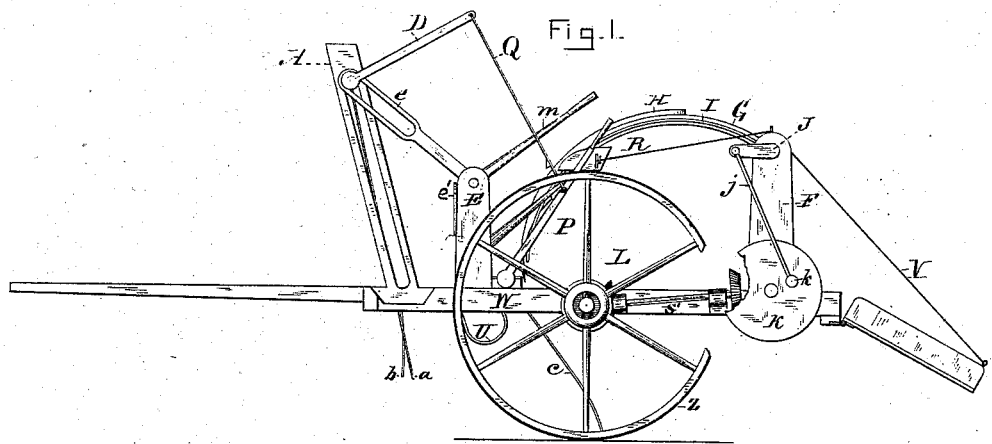
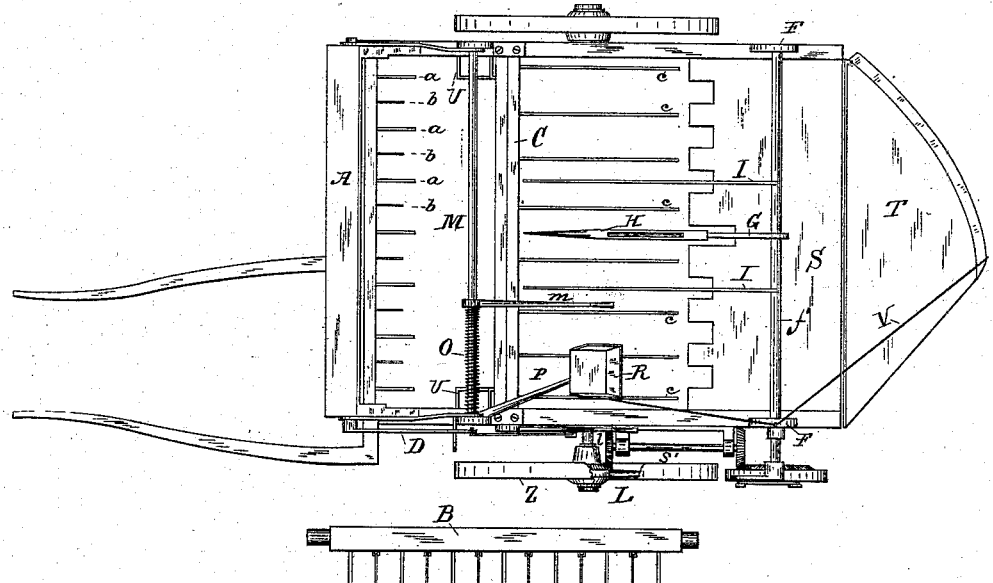
Witnesses:
J. N. McDonald
Percy Aughe
Inventor:
Henry N. Johnston
By W. J. Johnston
atty.

UNITED STATES PATENT OFFICE.

HENRY N. JOHNSTON, OF BROCKPORT, NEW YORK.

COMBINED GLEANER AND BINDER.

SPECIFICATION forming part of Letters Patent No. 237,540, dated February 8, 1881.

Application filed November 19, 1880. (Model.)

*To all whom it may concern:*

Be it known that I, HENRY N. JOHNSTON, a citizen of the United States, residing at Brockport, in the county of Monroe and State of New York, have invented certain new and useful Improvements in Combined Gleaner and Binder; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of machines in which grain, hay, &c., are gleaned, delivered on a platform, bound in sheaves, and dropped to the ground in shock bundles.

The object of my invention is to provide means for gleaning the grain, &c., form it into a gavel or sheaf, bind it, and dispose of it at suitable intervals along the ground.

The invention consists, essentially, in a frame mounted on wheels, and provided with a set of gathering and lifting teeth and a set of gleaning-teeth operated by suitable mechanism for gathering and lifting the grain or hay from the ground.

It further consists in a picker and picker-arm to remove the sheaf or gavel formed by the teeth and deposit it on a binding-platform, where it may be bound by suitable mechanism.

In the drawings, Figure 1 is a side elevation of my device; Fig. 2 a plan view, and Fig. 3 a detached view, of the head carrying the lifting and gathering teeth.

B represents the head or block provided with the gathering-teeth $a$ and the lifting-teeth $b$. Each alternate tooth is hinged and joined by a cross-bar, as shown in Fig. 3. This head is mounted in a slotted frame, A, and moves up and down in the slotted sides. Secured to the end or ends of the head B is a lever, D, and a slotted arm, $e$, which moves over the end extension of the head. A link-rod, Q, is attached at one end to the lever D and at the other to a lever, P, under the control of the driver or operator. A shaft, M, is mounted on the standards E, and is provided with a retracting-spring, O. A lever, $m$, is also rigidly attached to the shaft, and one end of the slotted arms $e$ is also secured to said shaft.

C represents a head or block resting on the frame or running-gear of the machine, and is provided with teeth $c$, which glean and carry the grain, &c., from the ground, so that when a sufficient amount is gathered to form a sheaf by said teeth $c$ the operator pushes forward and upward the lever $m$, which allows the head B and its teeth to move downward in the slots of the block A until they reach the ground. At this moment the teeth $a$ are pressed back toward the teeth $c$, carrying the grain upward and pressing it firmly between the teeth $c$. At the same time the hinged teeth $b$ fall to the ground and continue the operation of gleaning. While the grain-sheaf is held between the teeth $a$ and $c$ the driver or operator pushes forward the lever P, which is on the shaft-extension of the head C, and is connected, as before explained, with the head B, through the intervention of the link-rod Q and bar D, so that by pushing forward said lever the teeth $a$ and $c$ are lifted upward, with the gavel embraced between them, toward the binding-platform S. As this is accomplished the picker-arm G, rigidly secured to shaft $f$, moves downward, grasps the gavel or sheaf, and throws it on the platform S, where it may be bound by any suitable binding mechanism attached to the machines, or the gavel may be bound while it is held between the teeth $a$ and $c$, and then thrown on the platform by the picker-arm.

An arm, H, is pivoted to the picker-arm and assists in the operation of catching the gavel. It may be slotted on its top or side for the introduction of a binding wire or cord, and the picker itself may act, through the intervention of suitable mechanism, as a binding-point.

The arms I I, mounted on the shaft $f$, are auxiliary picker-arms, and assist in throwing the sheaf onto the platform by grasping the ends at the same time the picker grasps the center. The shaft $f$ and the picker and picker-arm mounted thereon are operated by a pitman-rod, $j$, and pitman crank-arm J, attached to end of shaft $f$. One end of the pitman-rod is secured to the pitman crank-arm, and the other to a projection on a disk, K, which is provided with a bevel-gear meshing with a gear wheel or pinion secured to one end of a pinion-shaft, $s'$, which has at its other end a bevel-gear wheel meshing with a crown-wheel on the hub of the wheel L. Of course this means of imparting motion to the disk K and the shaft $f$ may be varied at pleasure, and I do not confine myself to this particular method. As soon as the gavel is thrown on the platform the levers $m$ and P are released, and the heads B and C resume their normal position, the spring O assisting in bringing the shaft M and lever $m$ back. The teeth $c$ then resume their function of gleaning the grain from the ground, and pick up the grain already gathered by the pivoted teeth $b$. This operation may be continued until all the cut grain has been gathered. The backward movement of the teeth $b$ is limited by the stirrups U on the inside of the frame. A seat, R, is provided for the driver, and it may be large enough to hold the driver and an operator to work the levers, or an additional seat or place may be provided for the operator, or the whole may be within the control of the driver. A cord, V, passes from the hinged platform T to the driver's or operator's seat or position, so that when a sufficient number of sheaves have accumulated on the hinged platform to form a shock the platform may be released and allowed to fall to the ground and the sheaves fall off by gravity. A notched catch-piece, $e'$, is secured to the standard E for the purpose of holding the slotted arm $e$ when the head B and the arm are pressed down in the standard A, and is released when the head and arm $e$ are again moved upward.

It will be apparent that a tripping device may be substituted for the cord without departing from the spirit of my invention, and the levers $m$ and P may, by suitable mechanism, be operated by the foot of the driver.

My machine is simple in its construction, cheaply and lightly made, easily repaired, and can be used in conjunction with the ordinary reaper and mower, thus avoiding a more expensive and complicated machine.

I claim—

1. In a gleaner and binder, a head or block, B, moving in slotted standards and provided with a set of teeth pivotally secured to the head, a set of teeth rigidly secured to said block or head, and operated by suitable mechanism in such manner that when the head is lowered in the standards the pivoted teeth will glean, and the rigidly-secured teeth lift the gleaned grain from the ground, substantially as described, and for the purpose set forth.

2. In a gleaner and binder, the combination of a front head, provided with a set of pivotally-secured gleaning-teeth and a set of rigidly-secured lifting-teeth, with a rotating rear head having a set of gleaning-teeth, the heads being operated by suitable mechanism in such manner that the lifting-teeth of the front head will press a grain-gavel against the teeth of the rear head and carry it upward to a gavel-receiving platform, substantially as described, and for the purpose set forth.

3. In a gleaner and binder, a shaft, M, seated in the standards E, and provided with a lever, $m$, and spring O for rotating the shaft, in combination with the head B, substantially as described, and for the purpose set forth.

4. In a gleaner and binder, the combination of the blocks B C, levers $m$ and P, link-rod Q, and bar D, substantially as described, and for the purpose set forth.

5. In a gleaner and binder, the stirrups U, attached to the frame for limiting the backward movement of the pivotal teeth on the front head, B, substantially as described, and for the purpose set forth.

In testimony whereof I affix my signature in presence of two witnesses.

HENRY N. JOHNSTON.

Witnesses:
   C. F. HAMLIN,
   F. E. WILLIAMS.